March 25, 1958 S. H. KAST 2,828,053
RADIAL FEEDER
Filed May 11, 1956 3 Sheets-Sheet 1
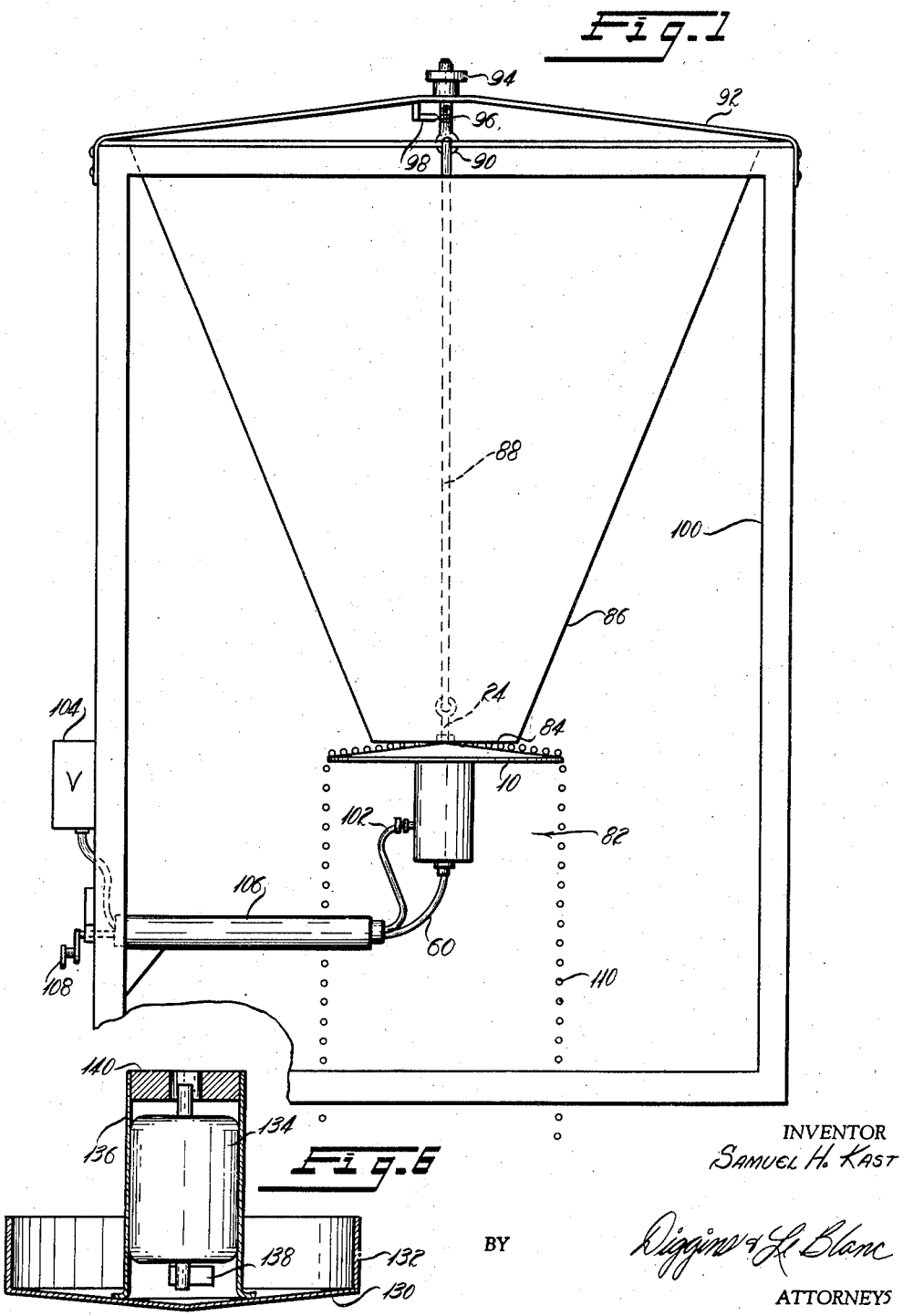
INVENTOR
SAMUEL H. KAST
BY Diggins & Le Blanc
ATTORNEYS

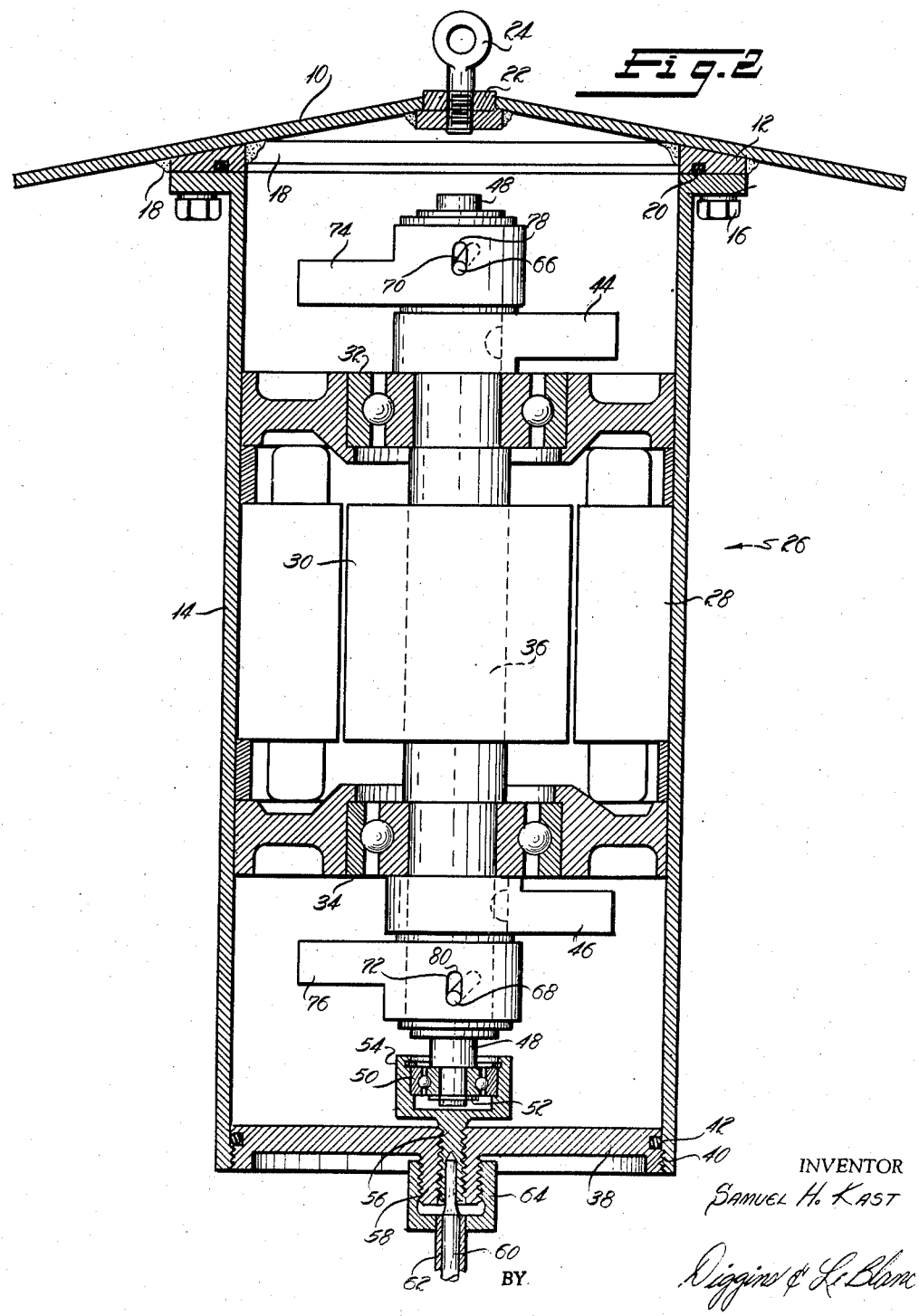

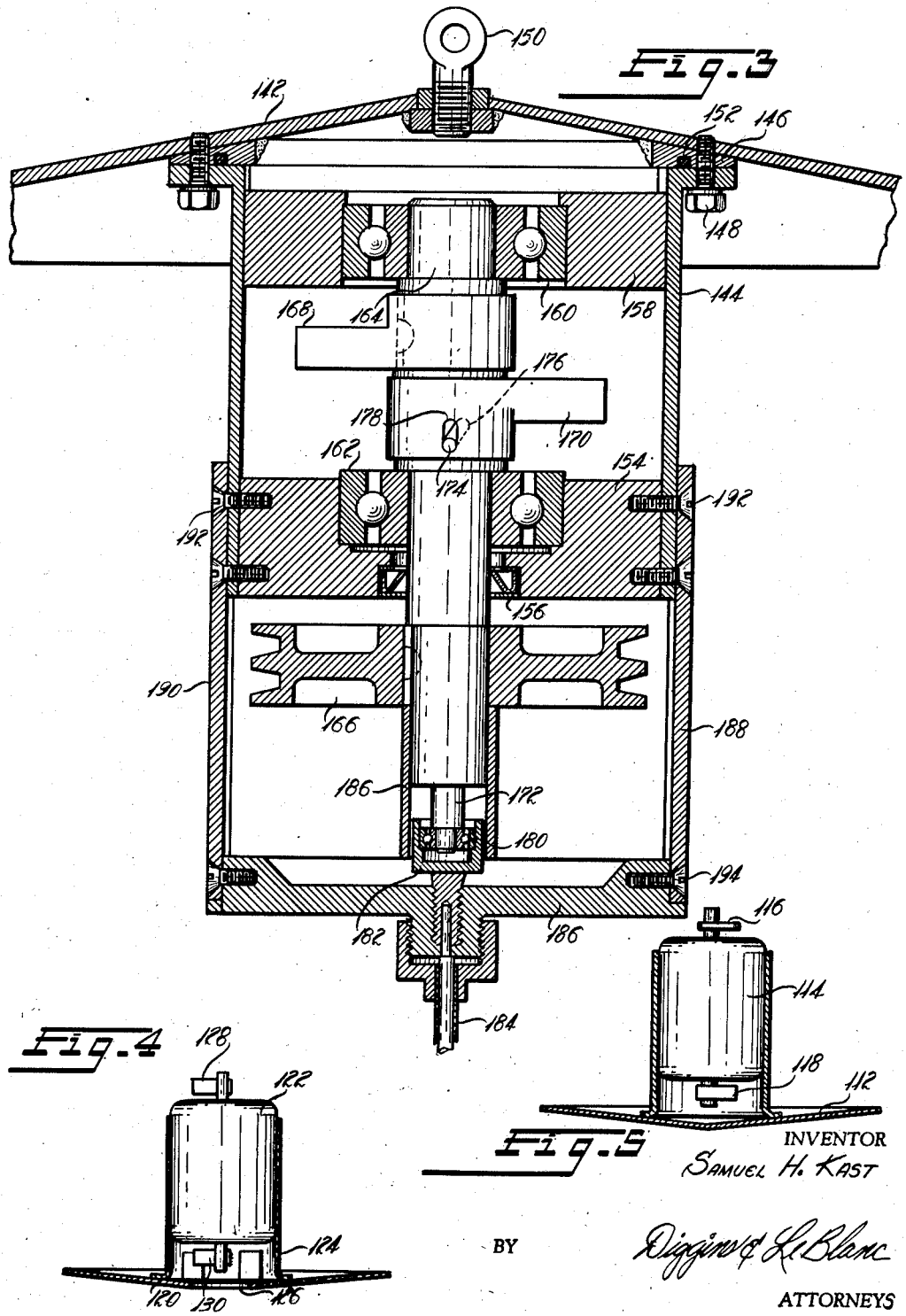

United States Patent Office 2,828,053
Patented Mar. 25, 1958

2,828,053
RADIAL FEEDER

Samuel H. Kast, Indian Rocks Beach, Fla., assignor to Radial Feeder Company, Largo, Fla., a corporation of Florida Application May 11, 1956, Serial No. 584,267

27 Claims. (Cl. 222—181)

This invention relates to an apparatus for feeding bulk material continuously or intermittently at a uniform adjustable, controllable and regulated rate.

In feeding bulk materials from a hopper it is conventional to utilize vibrating feeders which consist of an inclined trough vibrated at a high rate by an electromagnet energized by a pulsed current. The speed of flow of material through the feeder trough is controlled by a current control device which varies the amplitude of the pulses. The magnet, energized by the pulsating current, generally pulls the trough sharply down and back against the action of a spring which then returns the trough up and forward. The material in the trough falls perpendicularly as the trough is pulled sharply backwards out from under it and then as the spring returns the trough up and forward, the material is carried with it and the same action is repeated at high speed. The spring must necessarily be quite stiff in order to return the trough and material at high speed and this necessitates a large magnet in order to deflect the spring. A considerable amount of power is required and because of the inductive nature of the electromagnet the power factor is lagging and extremely low making the cost of the power relatively high. Because of the vertical component of movement of vibrating feeders of this type they cannot be suspended from the supporting structure without the use of vibration absorbing springs at the principal points of support and this tends to dampen the vibratory action. Feeders of this type thus are large and relatively expensive, require large amounts of electrical power at extremely unfavorable power factors, and necessitate separate and relatively expensive control equipment.

According to the present invention a feeder is provided which conveys bulk material by moving a conical shaped surface in a high speed orbital motion. This orbital motion causes the material to be conveyed radially along all radial lines over the entire surface of the cone. As another feature of the invention this same conical surface may be used to convey bulk material by providing it with a high speed wobbling motion which may be used in combination with the high speed orbital motion to impart various force vectors to the bulk material particles being conveyed. These force vectors may vary in amplitude and direction to cause the particles to attain various conveying motions such as radial, spiral, or circular, depending upon the ratio or relative values of the radius of the orbital motion and the amplitude of wobble. That is to say, the particular type of conveying motion imparted is dependent upon the ratio of the amplitude of the orbital movement in a plane containing the base of the cone to the amplitude of wobble of the cone.

The positive force vector resulting from any singular motion of the conical surface which results from the wobbling and orbital motions described above is a gliding force which traverses the entire surface of the cone as a radial line of force, the length of this line being equal to the distance along the surface of the cone from its vertex to the periphery of its base. This gliding line of force traverses the entire 360° of the surface of the cone once for every complete cycle of orbital displacement of the conical surface or for every complete cycle of the wobble displacement of the surface or, in the case of a combination movement, once every complete cycle of the resultant motion of the cone due to the combination of the individual motions. As a result of this continuously gliding line of force an extremely high efficiency of operation is obtained due to the fact that a positive accelerating force is never applied to the entire mass of the granular material covering the entire surface of the cone. Instead, only line contact is made between the surface of the cone and the bulk material and consequently the positive accelerating force magnitude required to displace the bulk material is very small.

It is accordingly a primary object of the present invention to provide a feeding apparatus for bulk materials, parts or objects, which feeds these materials at a controlled rate.

It is another object of the invention to provide a feeding apparatus for bulk materials, parts or objects having means to adjust the rate of feed.

It is another object of the invention to provide a bulk material feeder that is of simple construction, is small in size for high feed rates, is dependable, stable in operation, flexible in application and which provides for simplicity in installation.

It is another object of the invention to provide a bulk material feeder of the foregoing type which is adapted to operation from a wide variety of power sources and which presents simple maintenance requirements.

It is another object of the invention to provide a bulk material feeder having an extremely high efficiency and power factor.

It is still a further object of the invention to provide a novel bulk material feeder which may be used for screening, drying, separation of materials according to density and feeding parts or objects in a oriented manner.

These and further objects and advantages of the invention will become apparent upon reference to the following specification and claims and appended drawings wherein:

Figure 1 is a side elevation showing an application of the feeding device of the invention to a hopper;

Figure 2 is a vertical cross section of one embodiment of a feeder constructed according to the invention;

Figure 3 is a vertical cross section of another embodiment of a feeder constructed according to the invention;

Figure 4 is a vertical cross section showing one type of feed according to the invention;

Figure 5 is a vertical cross section showing a second type of feed according to the invention; and Figure 6 is a vertical cross section showing another type of feed according to the invention.

According to this invention a feed is provided for a bulk material through the use of a cone to which is imparted an orbital motion or a wobbling motion or a combination of both. Referring more particularly to Figure 2 there is shown one embodiment of an apparatus for providing such a motion. In this figure an inverted shallow cone 10 is provided with a mounting ring 12 to which a motor support tube 14 is attached by means of screws 16. The support ring 12 may be secured to the cone by any suitable means, such as by welds 18 and, in this particular embodiment of the invention, is preferably sealed to the tube 14 by means of an O-ring 20. A boss 22 is welded into the apex of the cone 10 and an eyebolt 24 is mounted therein for suspending the unit.

A motor, generally indicated at 26 and consisting of a stator 28, rotor 30, ball bearing assemblies 32 and 34 and hollow shaft 36, is mounted within the tube 14. The bottom of the tube is sealed by a bottom plate 38 which screw threadedly engages the tube at 40 and which is sealed thereto by means of an O-ring 42 so that the entire activating unit is sealed from the material being handled.

A pair of eccentric weights 44 and 46 are keyed to the hollow shaft 36 at either end of the motor 26. A plunger rod 48 is slidably received within the hollow shaft 36 and has its lower end secured to the inner race of a ball bearing 50 by means of a snap ring 52. The outer race of ball bearing 50 is in turn secured within a cup 54 having a screw threaded stud 56 extending from the lower end thereof. The stud 56 is received within a screw threaded sleeve 58 in the center of bottom plate 38 and is secured to a flexible shaft 60 having a casing 62 sealed to the sleeve 58 by means of a cap screw 64. The assembly of the cup 54 and stud 56 comprises a rod control member so that rotation of the flexible shaft 60 rotates the cup 54 and raises and lowers the plunger rod 48 by reason of the screw threaded connection between stud 56 and sleeve 58.

A pair of pins 66 and 68 are mounted in opposite ends of the plunger rod 48 and extend through helical slots 70 and 72 in hollow shaft 36 so that vertical sliding movement of the plunger rod 48 causes rotation thereof as the pins 66 and 68 move upwardly in helical slots 70 and 72. A pair of eccentric weights 74 and 76 are rotatably mounted over hollow shaft 36 and are provided with axial slots 78 and 80 which receives pins 66 and 68. It will thus be apparent that vertical movement of plunger rod 48 causes rotation of weights 74 and 76 with respect to hollow shaft 36 and with respect to fixed weights 44 and 46 which are keyed to the shaft. Weights 74 and 44 are identical, as are weights 76 and 46, and corresponding weights are arranged in diametrically opposite positions when the plunger rod 48 is in its lowermost position as shown in Figure 2.

Under the conditions shown in Figure 2 wherein the movable weights 74 and 76 are diametrically opposite to the fixed weights 44 and 46, operation of rotor 30 causes no movement of the feed device. When, however, flexible shaft 60 is rotated movable weights 74 and 76 move out of a balanced position with respect to fixed weights 44 and 46 thereby unbalancing the unit and causing a circular orbital movement. The amount of this movement is adjustable from zero to a maximum by turning the flexible shaft 60 which may obviously be controlled from a remote position. The flexibility of the shaft prevents its exercising any damping effect upon movement of the feeder unit. The motor 26 may be of the squirrel cage induction type which is rugged in construction and which is available for operation for all commercial sources of electric power, both single phase and polyphase, although other types of motors may also be used. A synchronous motor may be utlized where it is desired to maintain an absolutely constant shaft speed, or a universal motor may be employed where an adjustable speed and hence an adjustable cone motion frequency is desired. With this latter type of motor operation may be from either direct or alternating current and speed adjustment can easily be effected by means of a rheostat in the motor circuit.

Referring to Figure 1, a feed unit of the type shown in Figure 2 and herein referred to generally by the numeral 82, is suspended beneath the lower mouth 84 of a conical hopper 86 by means of a cable 88 which is attached to the eye bolt 24 on the feeder unit 82. The upper end of the cable 88 is attached to a further eye bolt 90 adjustably secured to the support member 92 by means of a nut 94.

A scale 96 may be conveniently provided on the eye bolt 90 for cooperation with a pointer 98 for indicating the position of the feeder unit. Hopper 86 is supported in a suitable frame 100 and power is supplied to feeder unit 82 by means of cable 102 and switch box 104. The flexible shaft 60 terminates in a control crank 108 on the frame 100 and a tube 106 is provided for protecting the power cable 102 and flexible shaft 60 from the material being handled. When the crank 108 is positioned so as to impart an orbital motion to the cone 10 bulk material in the hopper 86 is fed radially across the surface of the cone 10 as shown at 110. The rate of feed is controllable by means of the crank 108 as well as by the position of the cone 10 as controlled by eye bolt 90 and nut 94.

Because of the relatively large conveying area of the shallow cone 10 as compared to the areas of conventional troughs, the weight of the cone of the radial feeder shown in Figure 1 is considerably less than the weight of a conventional trough which could be utilized to perform the same feeding job. Further, the inherent stiffness and rigidity of a conical surface eliminates the necessity for bracing thereby further decreasing the weight of the unit. This light weight reduces the amount of power which the prime mover must supply in order to provide the desired feed. The cone of the radial feeder of Figure 1 presents an optimum surface to the material flow, namely downward and outward in all directions at the discharge opening of the hopper, as compared to conventional trough feeders wherein special chutes or adaptors are necessary to supply the trough from the hopper opening and force changes in direction to bring all material flow into line with the trough. With the cone of the present invention flow is more natural in that a minimum amount of diversion is necessary and this eliminates much of the packing and clogging which has been experienced in conventional feeders. Because of the high area of discharge possible with a cone type feeder, i. e., 360°, the height of the opening from the surface of the cone to the bottom of the hopper need not be as great as in the case of trough type feeders. This feature makes it possible to utilize small cone diameters for high rates of feed and this in turn further decreases the mass which the prime mover must drive. Because the cone is not subjected to any vertical motion whatsoever the feeder device may be suspended by its vertex and transmits practically no motion whatsoever to the support.

In addition to being dependent upon the amplitude of motion of the cone and the height of the opening between the surface of the cone and the bottom of the hopper, the rate of feed is also dependent upon the angle of slope of the conical surface. Changes in this slope angle result in different ratios of vertical bounce to horizontal displacement of the bulk material particles in the course of their incremental movements and this causes different rates of feed. This characteristic makes it possible to design specific cones for particular screening characteristics, as for instance, where high bounce is desirable, or also for designing for high speed conveying where large horizontal components of motion are required during the incremental motion of the particle.

A unit of the type illustrated in Figure 2 may be used for feeding at variable and controlled rates, for screening, for gate control of the hopper opening and for drying, it being apparent that efficient drying may be accomplished because of the thin layer in which the material is spread over the cone.

While the feeder unit illustrated in Figure 2 produced solely an orbital motion of the cone feeder it is also an important feature of the invention that the cone may also have a wobbling motion imparted thereto. Thus referring to Figure 5 there is shown an embodiment of the invention wherein an inverted cone 112 is driven by means of a motor 114 having eccentric weights 116 and 118 at opposite ends thereof. While the weights at opposite ends of the motor in the embodiment of the invention shown in Figure 2 were substantially identical, the weights 116 and 118 in the embodiment shown in Figure 5 are of a different mass so that operation of the motor not only imparts an orbital motion to cone 112 but also imparts a wobbling motion about a point on the center line of the motor. This embodiment of the invention is shown in a simplified form although it will be apparent that the prime mover may be constructed in the manner shown in Figure 2 with remote control of the eccentricity of the weights. With this type of arrangement, the feed is no longer radially outward but is spirally outward and upward over the edge of the cone 112. The motor 114 may obviously be mounted either above or below cone 112.

While it was stated hereinabove that the weights in the embodiment of Figure 2 were substantially equal, actually the upper weight is slightly heavier in order to compensate for the weight of the cone at the top of the unit. Thus pure orbital motion may be produced with unequal weights and an additional difference of weights is necessary if wobble is to be achieved.

Referring to Figure 4 there is shown still another embodiment of the invention wherein an inverted cone 120 has a motor 122 mounted thereon by means of a bracket 124. The cone 120 is provided with an aperture 126 at its apex and the bracket 124 is provided with suitable passages to permit material to be fed inwardly through the aperture 126. Eccentric weights 128 and 130 are provided on the motor shaft and provide an orbital motion which feeds the material radially inward through the aperture 126.

Referring to Figure 6 there is shown still a further embodiment of the invention wherein a cone 130 having a vertical peripheral wall 132 is suspended from a motor 134 by means of a tube 136. An eccentric weight 138 is provided at the lower end of the motor shaft and a fixed weight 140 is provided at the upper end of the unit in the tube 136. With this type of arrangement material in the bowl formed by cone 130 and peripheral wall 132 will be subjected to a circular movement around the center of the cone and the unit may be used for feeding parts or objects in an oriented manner from one or more discharge points in the bowl. This feeding and orienting function results from the circular movement of the parts over orienting mechanisms and discharge chutes integral with or associated with the bowl. In all embodiments the motor may be mounted either above or below the cone.

While the previously decribed embodiments of the invention have utilized a motor integrally contained within the feeder unit it is also contemplated that the feeder unit may be driven by means of a remotely located prime mover. An embodiment of this type is shown in Figure 3 wherein a cone 142 is connected to a tube 144 by means of mounting ring 146 and screws 148. An eye bolt 150 is provided in the top of the cone for suspending the unit. The upper end of tube 144 is sealed by means of O-ring 152 and the lower end of the tube is sealed by bearing housing 154 and oil seal 156. An upper bearing housing 158 mounts a ball bearing 160 in the upper end of tube 144, while a second ball bearing 162 is carried by ball bearing housing 154. A hollow shaft 164 is mounted within the bearings 160 and 162 and has a sheave 166 mounted on and keyed to its lower end. A fixed weight 168 is keyed to the upper end of hollow shaft 164 and a movable weight 170 is mounted immediately therebelow. The hollow shaft 164 carries a slidable plunger rod 172, as in the embodiment of the invention shown in Figure 2, and this plunger rod is provided with a pin 174 passing through a helical slot 176 in hollow shaft 164 to engage an axial slot 178 in movable weight 170 and thus control its position. The lower end of plunger rod 172 is received in a ball bearing 180 which is carried by a cup 182 similar to the arrangement in Figure 2. The axial position of cup 182 is controlled by means of a flexible shaft 184, as described in connection with the embodiment of the invention shown in Figure 2, and the ball bearing 180 in the cup is shielded by means of a sleeve 186 mounted on the lower end of hollow shaft 164. The bottom plate 186 is attached to tube 144 by means of a pair of brackets 188 and 190 secured by screws 192 and 194.

The operation of this embodiment of the invention is essentially similar to that shown in Figure 2 with the exception that only one set of eccentric weights is employed with a ball bearing assembly on either side of the weights. Control of the orbital motion is again by means of the flexible shaft 184 and the main difference is that the unit of Figure 3 is driven by means of a belt which engages sheave 166. The amplitude of movement of the feeder unit is so small as not to interfere with this driving connection. It will be apparent that while this embodiment has been shown with only a single set of weights, a spaced pair of weights may be utilized as shown in Figure 2.

It will be apparent from the foregoing that the radial feeder of this invention is capable of fulfilling the objects of the invention as set out hereinabove. The feeder is designated a radial feeder because the conveying force which it produces is a gliding or rotating radial line of force which produces force vectors therealong such as to impart motion to particles of material coming into contact with the surface of the feeder upon which the vectors are acting. The particle motion produced may be outwardly or inwardly radial, outwardly or inwardly spiral, or circular. The angular velocity of the rotational line of force and the magnitude and direction of the force vectors are dependent upon the frequency and amplitude of the various cyclic motions imparted to the cone of the radial feeder. While the adjustable movement prime mover of the invention is preferably used with a cone it may also be used with more conventional screens and feeders to obtain an inexpensive rate adjustment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A feeder device comprising a shallow cone shaped member, means supporting said cone shaped member for motion at an angle to the axis of the cone shaped member, bearing means attached to said cone shaped member, a shaft in said bearing means having its axis substantially coincident with the axis of said cone shaped member, eccentric weight means on said shaft, and means for rotating said shaft and weight means to cause said cone shaped member to move at an angle to the axis of said shaft.

2. A feeder device comprising a shallow cone shaped member, means supporting said cone shaped member for motion at an angle to the axis of the cone shaped member, bearing means attached to said cone shaped member, a shaft in said bearing means having its axis substantially coincident with the axis of said cone shaped member, first eccentric weight means on said shaft, second eccentric weight means on said shaft spaced from said first weight means, and means for rotating said shaft and weight means to cause said cone shaped member to move at an angle to the axis of said shaft.

3. A feeder device comprising a shallow cone shaped member, means supporting said cone shaped member for motion at an angle to the axis of the cone shaped member, bearing means attached to said cone shaped member, a shaft in said bearing means having its axis substantially coincident with the axis of said cone shaped member, first eccentric weight means on said shaft, second eccentric weight means on said shaft spaced from said first weight means, and means for rotating said shaft and weight means, said first and second weight means being of a shape and weight to produce different unbalance forces on said shaft during its rotation to cause said cone shaped member to move at an angle to the axis of said shaft.

4. A feeder device comprising a shallow cone shaped member, means supporting said cone shaped member for motion at an angle to the axis of the cone shaped member, bearing means attached to said cone shaped member, a shaft in said bearing means having its axis substantially coincident with the axis of said cone shaped member, a pair of eccentric weight means on said shaft, and means for rotating said shaft, one of said weight means being movably mounted on said shaft with respect to said other weight means and adjustable into a first position wherein said shaft is substantially balanced and into a second position wherein said shaft is unbalanced.

5. A feeder device comprising a shallow cone shaped member, bearing means attached to said cone shaped member, a shaft in said bearing means having its axis substantially coincident with the axis of said cone shaped member, a pair of eccentric weight means on said shaft, means for rotating said shaft, one of said weight means being movably mounted on said shaft with respect to said other weight means and adjustable into a first position wherein said shaft is substantially balanced and into a second position wherein said shaft is unbalanced, and means for moving said movable weight from a remote position.

6. A feeder device comprising a shallow cone shaped member, bearing means attached to said cone shaped member, a hollow shaft in said bearing means and having its axis substantially coincident with the axis of said cone shaped member, a first eccentric weight means on said shaft, a second eccentric weight means on said shaft, one of said weight means being movably mounted on said shaft with respect to said other weight means, a rod slidably mounted in said hollow shaft, and means connecting said rod and at least one of said weight means to rotate said weight means as said rod is moved axially of said shaft.

7. A feeder device as set out in claim 6 wherein said connecting means comprises a pin fixed in said rod and extending through a helical slot in said shaft into an axial slot in said weight means connected to said rod.

8. A feeder device as set out in claim 6 wherein said bearing means is attached to said cone shaped member by means of a housing, a support member extending transversely of said shaft and rod and attached to said housing, and means for moving said rod axially comprising a rod control member attached to the end of said rod and movably received in said support member for movement along the axis of said rod.

9. A feeder device as set out in claim 8 wherein said rod control member is rotatably affixed to said rod so that said rod may rotate with respect to said rod control member, and wherein said rod control member is attached to said support member by a screw connection.

10. A feeder device as set out in claim 6 including a sheave mounted on said shaft for imparting rotation thereto.

11. A feeder device as set out in claim 6 wherein said shaft is the shaft of a motor having its stator connected to said cone shaped member.

12. A feeder device comprising a shallow cone shaped member, bearing means attached to said cone shaped member, a hollow shaft in said bearing means, a first pair of eccentric weights mounted on said shaft adjacent one another, a second pair of eccentric weights mounted on said shaft adjacent one another but spaced from said first pair of weights, one weight in each pair being rotatably mounted with respect to its associated weight, a rod slidably mounted in said shaft, and means connecting said rod and said movable weights to rotate said weights as said rod is moved axially of said shaft.

13. A feeder device as set out in claim 12 wherein said shaft is the shaft of a motor having its stator attached to said cone shaped member.

14. In a material feeding system including a hopper having an aperture in the bottom thereof, a feeder device comprising a shallow cone shaped member suspended below said aperture by means of a cable passing up through said aperture, a force producing means, and mounting means connected to said force producing means and to said cone shaped member to attach said force producing means to said cone shaped member for moving said member in an orbital path as said force is produced.

15. In a material feeding system including a hopper having a support member thereabove and an aperture in the bottom thereof, a feeder device comprising a shallow cone shaped member suspended below said aperture by means of a cable passing up through said aperture and secured to said support member, means for raising and lowering said cable to change the spacing between said cone shaped member and said aperture, a force producing means and mounting means connected to said force producing means and to said cone shaped member to attach said force producing means to said cone shaped member for moving said member in an orbital path as said force is produced.

16. A feeder device comprising a shallow cone shaped member, a force producing means and mounting means connected to said force producing means and to said cone shaped member to attach said force producing means to said cone shaped member for producing an orbital motion of said cone shaped member as said force is produced.

17. A prime mover comprising a stator member, bearing means attached to said stator member, a hollow shaft in said bearing means, a first eccentric weight on said shaft, a second eccentric weight on said shaft, at least one of said weights being movably mounted on said shaft with respect to said other weight, a rod slidably mounted in said hollow shaft, and means connecting said rod and at least one of said weights to rotate said weight as said rod is moved axially of said shaft.

18. A prime mover as set out in claim 17 wherein said connecting means comprises a pin fixed in said rod and extending through a helical slot in said hollow shaft into an axial slot in said weight connected to said rod.

19. A prime mover as set out in claim 18 including a support member attached to said stator, and means for moving said rod axially of said shaft comprising a rod control member attached to the end of said rod and movably received in said support member for movement along the axis of said rod.

20. A prime mover as set out in claim 19 wherein said rod control member is rotatably affixed to said rod so that said rod may rotate with respect to said rod control member, and wherein said rod control member is attached to said support member by a screw connection.

21. A prime mover as set out in claim 17 wherein said shaft is the shaft of a motor and said stator is the stator of said motor.

22. A prime mover as set out in claim 17 including a sheave mounted on said shaft for imparting rotation thereto.

23. A feeder device comprising a shallow dished pan with walls converging toward an axis, means supporting said pan for motion at an angle to said axis, bearing means attached to said pan, a shaft in said bearing means having its axis substantially coincident with the axis of said pan, eccentric weight means on said shaft, and means for rotating said shaft and weight means to cause said pan to move at an angle to said axis.

24. A feeder device comprising a shallow dished pan with walls converging toward an axis, means supporting said pan for motion at an angle to said axis, weight means eccentric to said axis supported from said pan for circular motion about said axis, and means for causing said weight means to move in a circular path about said axis to move said pan at an angle to said axis.

25. A feeder device comprising a shallow cone shaped member, means supporting said cone shaped member for motion at an angle to the axis of said cone shaped member, weight means eccentric to said axis supported from said cone shaped member for circular motion about said axis, and means for causing said weight means to move in a circular path about said axis to move said cone shaped member at an angle to said axis.

26. In a material feeding system including a hopper having an aperture in the bottom thereof, a feeder device comprising a shallow dished pan having walls converging toward an axis suspended below said aperture, weight means eccentric to said axis supported from said pan for circular motion about said axis, and means for causing said weight means to move in a circular path about said axis to move said pan at an angle to said axis.

27. In a material feeding system including a hopper having an aperture in the bottom thereof, a feeder device comprising a shallow generally cone shaped member suspended below said aperture by cable means, weight means eccentric to the axis of said cone shaped member supported from said cone shaped member for circular motion about said axis, and means for causing said weight means to move in a circular path about said axis to move said cone shaped member in an orbital path.

References Cited in the file of this patent

UNITED STATES PATENTS

| | | |
|---|---|---|
| 689,540 | Colomy | Dec. 24, 1901 |
| 1,183,958 | Combs | May 23, 1916 |